April 1, 1924.

C. E. R. DAVIS 1,488,476

FILM AND PLATE MAGAZINE FOR CAMERAS

Filed Aug. 24, 1921

C. E. R. Davis
INVENTOR.

BY John M. Spellman
ATTORNEY

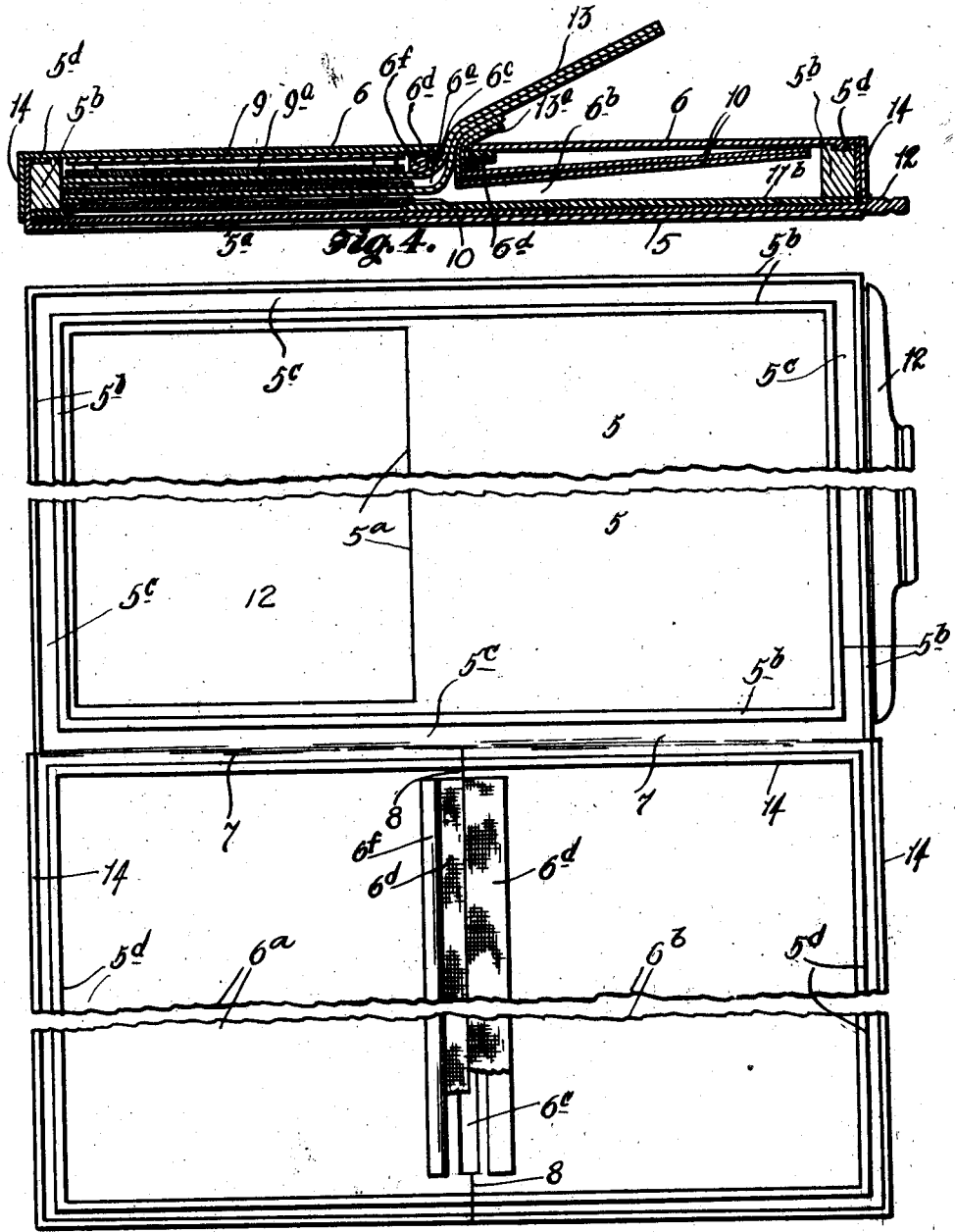

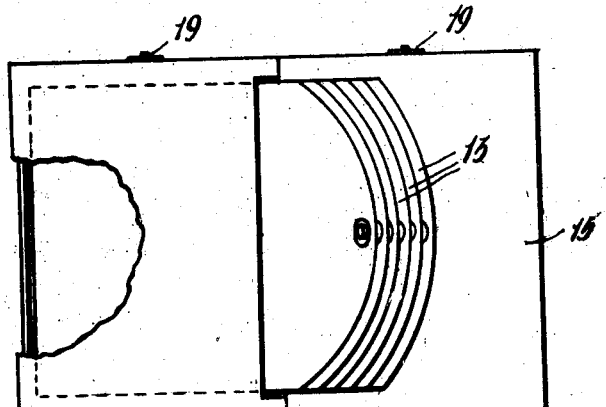
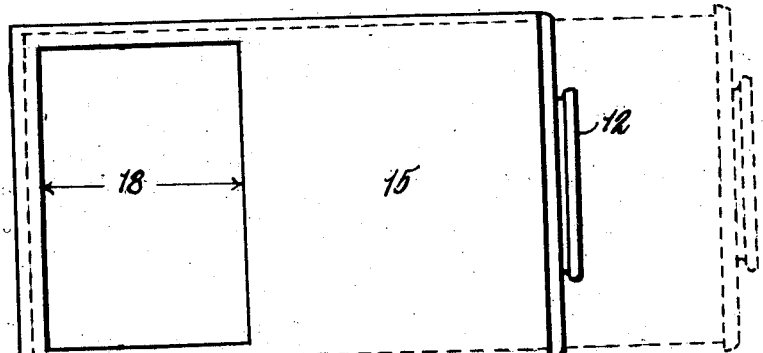
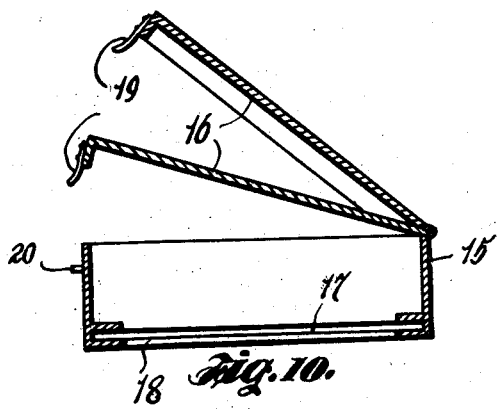

Patented Apr. 1, 1924.

1,488,476

UNITED STATES PATENT OFFICE.

CLAUDE E. R. DAVIS, OF SAN ANTONIO, TEXAS.

FILM AND PLATE MAGAZINE FOR CAMERAS.

Application filed August 24, 1921. Serial No. 495,000.

*To all whom it may concern:*

Be it known that I, CLAUDE E. R. DAVIS, a citizen of the United States, residing at San Antonio, in the county of Bexar and State of Texas, have invented certain new and useful Improvements in Film and Plate Magazines for Cameras, of which the following is a specification.

This invention relates to improvements in cameras and in such connection it relates more particularly to a magazine for holding films or plates.

The principal object of the invention is to provide a film and plate magazine so constructed that any number of films and plates from one to as many as may be desired may be exposed in one end of the magazine and transferred to the other end of the magazine by means hereinafter fully explained, and that the magazine shall be used directly in the carriage of the camera without the necessity of the use of plateholders, filmholders, or adapters, and that furthermore the films or plates that are packed or loaded into this magazine at the factory or loading plant may be exposed in any photographic camera that is equipped with a suitable carriage such as is shown in Figure 1 of the accompanying drawings, without the necessity of transferring the films or plates from the original plate and film magazine to another plate or film holder or adapter that will necessitate the use of a darkened room, changing cabinet or the like, to exclude the light, and to make the whole process of loading the camera a daylight operation.

Another important feature of the invention is the provision of means whereby the magazine may be used with or without a receptacle or extra box for holding the films or plates.

Other advantages and minor features of the invention will become apparent as the description of the magazine proceeds, reference being had to the accompanying drawings, forming part hereof, in which:

Figure 4 is a longitudinal sectional view taken on line 4—4, Figure 2, the view enlarged and showing a supply of films or plates and the relative positions of same before and after exposure.

Figure 5 is a view of the magazine opened showing the interior arrangement, each half in broken formation for convenience of illustration, the films or plates removed.

Figure 8 is a rear elevational view of a receptacle for holding the films or plates, to be used in connection with the magazine when desired.

Figure 9 is a front elevational view of the receptacle, and

Figure 10 is a cross sectional view thereof.

Figure 1:
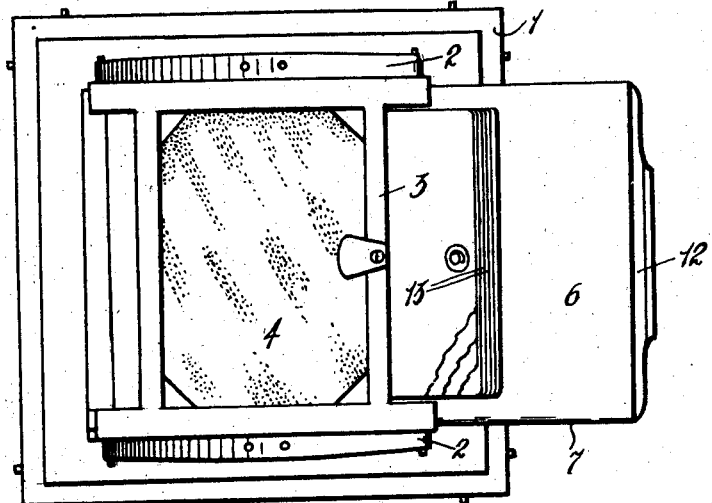
Figure 1 is a back view of an especially constructed carriage or reversible back of a professional type of camera for use with films or plates and illustrating a film and plate magazine constructed in accordance with the invention inserted therein.

Referring to the drawings more in detail, 1 denotes the back end of a camera of the professional type with the usual springs 2—2. These springs usually occupy a parallel vertical position the same being arranged horizontally parallel for the purpose of insertion of the magazine. The springs are secured to a frame 3 for holding the plates, as in the ordinary plate holder, and 4 denotes the ground glass for the purpose of obtaining the correct focus of the lens. The magazine may be constructed of various sizes for professional cameras or those of amateur type. It will be noted by reference to the drawings, Figure 1, that the carriage for the back of the camera is what is known as a reversible back, and that, while the film and plate magazine is either in place in the carriage or is withdrawn from the carriage, the carriage or reversible back may be reversed or partly turned and replaced on the back of the camera so that exposures may be made either vertically or horizontally as the operator may desire to make them.

The magazine comprises an oblong shaped box in two parts or halves, a body portion 5 and a cover or top portion equally divided at 8 into two pieces 6ª and 6ᵇ hinged preferably by a cloth strip 7 to the bottom portion 5, so that the magazine may be opened in the manner illustrated in Figure 5.

The bottom or body portion 5 has an opening 5ª for allowing the light passing through the lens of the camera to strike a film or plate 10 and has also a slit or opening 11 and strips 11ª for insertion and guiding a slide 12 of usual construction for use of plates. The films or plates are held in position by a spring plate 9 and a cover plate 9ª of cardboard or of any suitable material to permit the legs 9ᵇ to be seated evenly and press the plates or films firmly to hold them against one another and in register. 11ᵇ denotes a bottom member which with bottom portion 5 and strips 11ª hold the slide in place.

Figure 2:
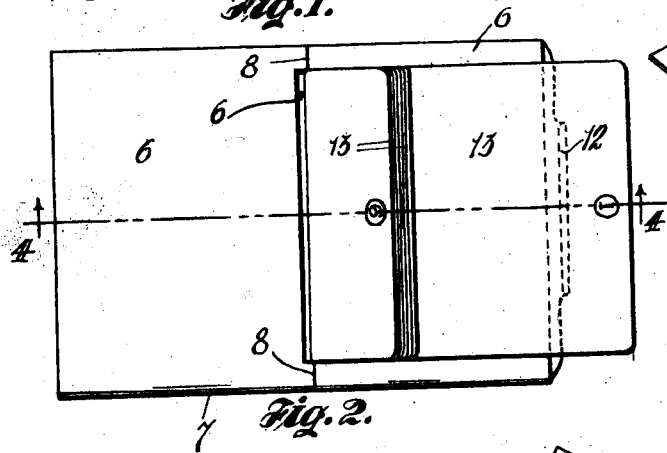
Figure 2 is a rear elevational view of the magazine removed from the carriage and is shown as it would appear after the first exposure is made and the first film or plate has been transferred from the exposure compartment to the safety compartment of the magazine.
Figure 6:
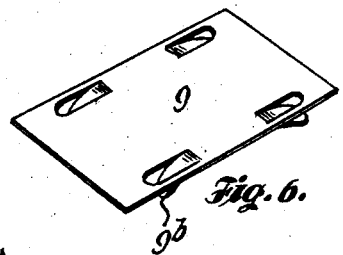
Figure 6 is a spring plate the function of which is to press against another plate of suitable material inserted between the spring plate and the films or plates to hold the same in proper position.
Figure 7:
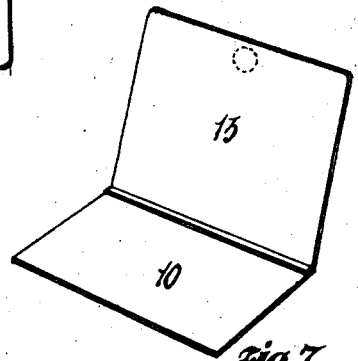
Figure 7 is a perspective view of a photographic plate or film with its tab or leaf attached thereto.
Figure 3:
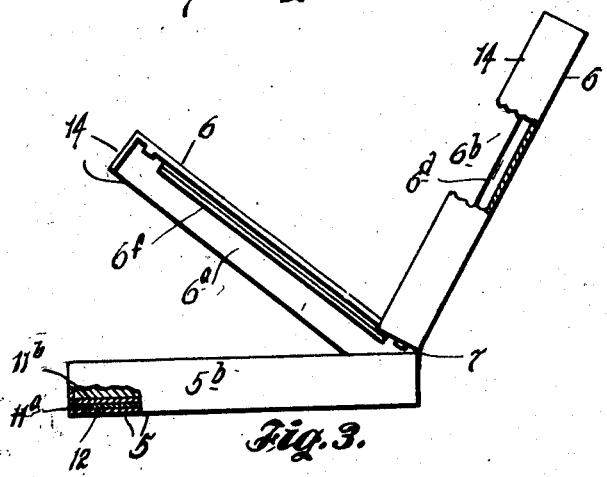
Figure 3 is an end view with the hinged covers swung outward.

To each film or plate 10 is secured a tab or leaf 13 bearing a numeral as shown for any number of films or plates, by preference one to six or twelve according to requirements. The tab or leaf 13 is for the purpose of pulling the film and thereby sliding or transferring it from one end to the other of the magazine as illustrated in the drawings, wherein in Figure 2 the exposed film bearing the tab or leaf No. 1 has been pulled and in Figure 4 the film shifted from exposure end 6ª to safety end 6ᵇ. Figure 4 also shows the manner of clipping off the tabs 13, if the operator so desires, leaving the stubs 13ª, as each film or plate is exposed and transferred.

This tab may be made of any flexible and opaque material, such as paper, cloth, etc., or of any flexible material which although not opaque will render "non-actinic" any light that may pass through the first film while exposure is made and thereby avoid "fog" on the second film back of the one being exposed. Attention is also called to the manner of attaching the tab to said plate or film. The tab may be glued or fastened to either the back or front of the plate or film with any suitable adhesive, by attaching the tab to the edge of the film or plate and folding over on the back thereof. Said film or plate with the tab attached and folded as above should be placed in the exposure end with the side where the tab is attached at the end farthest from the slot through which the end of tab projects and with the front of film or plate turned toward the opening that is left in the exposure end for the purpose of allowing the exposure of the film or plate when ready to do so.

The top or cover of the magazine comprising the two divided sections 6—6 has its sides and ends 14 lapped over the sides and ends 5ᵇ of the bottom 5, the sides and ends 5ᵇ having a groove 5ᶜ for receiving a rib 5ᵈ for securely locking the sides and ends of the magazine against light. A light lock is also provided at the inner ends of the sections 6—6 at 6ᵈ to prevent light from entering at slot 6ᵉ where the tabs project from the magazine. 6ᶠ denotes a round surfaced post around which the tabs are pulled, but not the film, to draw the films or plates from one compartment to the other. The films are not, as in some other packs or magazines, drawn around the post, but remain flat and secure from scratches and abrasions.

In case the material of which the magazine is constructed is not very substantial and where the magazine needs to be more rigid, there is provided a receptacle 15, see Figures 8, 9, and 10. This receptacle or box may be constructed of cardboard, wood or metal, or of any suitable material. The receptacle has sectionally hinged covers 16, slide slot 17 for the slide 12, an opening 18 to correspond with the magazine opening 5ª and is provided with spring latches 19—19 and engaging pins 20—20. The receptacle, as will be noted in the drawing, is provided with a slot for the tabs 13, but has no middle interior strips for protection against light, as the light locking arrangement is provided for in the magazine. When the magazine and receptacle are to be used together, the magazine is slipped inside the receptacle and the two together form a strong compact container for the films or plates.

Particular attention is directed to the manner of pulling or transferring the films or plates and their position in the magazine. As each film is pulled it will lie in the position shown in the drawing, Figure 4, against the underside of the cover 6, hence the next film or plate will not be pushed along any film or plate already exposed and transferred to the compartment 6ᵇ, and all liability of scratching or marring the surfaces of the films or plates is removed.

When the films are placed with number 1 facing the exposure opening, and number 2 laid immediately on the back of the tab of number 1, and number 3 laid on the back of the tab attached to number 4, and so on indefinitely there will be an opaque tab back of each film that will serve to protect the succeeding film from being injured by light or "fogged" and will also serve the purpose of transferring the plate or film from the exposure compartment to the safety compartment.

It will also be noted that the film or plate to be used in this magazine is not placed in any other holder or kit as it is in the case of other magazines; and also that this film and plate magazine may be manufactured to handle any size plate or film, that the special carriage or reversible back may be built to fit and be adjusted to any size or type of camera, either professional or amateur, and that as heretofore pointed out, any number of films or plates may be packed in the magazine as are practicable.

What is claimed is—

1. A camera magazine comprising a chamber for sensitized elements and having spaced grooves, a divided hinged cover for the chamber and having slot between the cover-parts, each cover part having a rib to be received by the respective grooves of the chamber, and means about the slot to exclude light from the chamber when changing the sensitized element therein.

2. A magazine for holding a plurality of sensitized elements in cameras, said magazine provided with divided, hinged cover portions, with a slot therebetween, each sensitized element provided with a tab for projection through said slot and adapted to be pulled outward to push one sensitized element from one end of the magazine to the other; a post against which said tabs are pulled in the transferring operation; light locks on each side of the slot, the magazine having an opening for light from the camera lens, and a slide slot in its end; in combination with an auxiliary receptacle or box having hinged top portions, tab and slide slot, and arranged to receive the magazine therein when desired, said magazine adapted to be used with or without the receptacle or box.

3. A magazine for holding sensitized elements in a camera, said magazine consisting of a single chamber provided with a divided hinged cover with an intermediate slot between the divided parts, a light locking means for the slot and a guide post inside the magazine adjacent the slot, a tab projecting through said slot and attached to each sensitized element for moving the same from one end of the magazine to the other, in combination with an auxiliary receptacle or box, said magazine adapted to be used with or without the receptacle.

4. A magazine of the character described, comprising a single chamber partially divided by a guide post and provided with an opening adjacent the post with a light lock, said magazine having hinged lids and adapted to hold a plurality of sensitized elements, tabs secured to said sensitized elements and folded along the back thereof and arranged to push the sensitized elements when the tabs are pulled, from one end of the magazine to the other in a straight line without bending or rolling.

In testimony whereof I have signed my name to this specification.

CLAUDE E. R. DAVIS.